(12) United States Patent
Murfin

(10) Patent No.: US 6,710,472 B2
(45) Date of Patent: Mar. 23, 2004

(54) SAFETY SWITCH APPARATUS FOR USE IN A REMOTE STARTER SYSTEM OF VEHICLE

(75) Inventor: William Scott Murfin, Dundas (CA)

(73) Assignee: Karen E. Moyler, Dundas (CA)

( * ) Notice: Subject to any disclaimer, the term of this patent is extended or adjusted under 35 U.S.C. 154(b) by 147 days.

(21) Appl. No.: 10/120,432

(22) Filed: Apr. 12, 2002

(65) Prior Publication Data

US 2003/0193241 A1 Oct. 16, 2003

(51) Int. Cl.$^7$ .................................................. H02G 3/00
(52) U.S. Cl. ........................ 307/10.6; 307/10.3; 123/595
(58) Field of Search .............................. 307/10.6, 10.2, 307/10.3; 123/595, 210, 146

(56) References Cited

U.S. PATENT DOCUMENTS

| | | |
|---|---|---|
| 4,371,051 A | 2/1983 | Achterholt |
| 4,554,422 A | 11/1985 | Embrey et al. |
| 5,646,457 A | 7/1997 | Vakavtchiev |

OTHER PUBLICATIONS

"Atlastart Remote Vehicle Starter", Installation and Owner'sManual, G.I.T. Security Products, Montreal, Quebec, Canada.

"Model 800 + Plus with Alarm", Installation and User Guide, Sep. 28, 2001, DSE Canada Inc., Mont–Royal, Quebec, Canada.

*Primary Examiner*—Gregory J. Toatley, Jr.
(74) *Attorney, Agent, or Firm*—Patrick J. Hofbauer

(57) ABSTRACT

A safety switch apparatus for use in a remote starter system of a vehicle, the apparatus having a magnetically actuated electrical switch for disabling the starter system when the switch is closed and a transmission of the vehicle is in-gear, and a magnet for urging the switch into a switched position when the magnet is adjacent thereto. The switch is securely mountable at a fixed mounting position on a frame of the vehicle, and the magnet is directly and securely mountable on a translatable portion of a user actuator for shifting the transmission. The translatable portion of the user actuator is operatively interposed between the transmission and a shifter handle portion of the user actuator. Both the fixed mounting position and the translatable portion are substantially concealed and substantially exterior relative to an interior seating compartment of the vehicle.

4 Claims, 4 Drawing Sheets

SAFETY SWITCH APPARATUS FOR USE IN A REMOTE STARTER SYSTEM OF VEHICLE

FIELD OF THE INVENTION

The present invention relates to a switch apparatus for use in a starter system of a vehicle, and more particularly, to a safety switch apparatus for use in a remote starter system of a vehicle having a transmission and a user actuating means for shifting said transmission.

BACKGROUND OF THE INVENTION

In the last century, and since the dawn of the modern automobile age, cars have become an essential part of the daily routine of people around the world. Perhaps, in part, because of their still growing importance and their increasing integration into the lives of ordinary people, improvements have continually been made in automobile design in an effort to better adapt them to the particular needs of individual drivers and passengers In recent years, a common modification to the modern automobile has been to install a remote starter system, typically having an electronic component, as means by which a person might start their vehicle from a removed location.

In recognition of the fact that a vehicle having a manual transmission may sometimes be left in an in-gear configuration when shut off, and insofar as remote starter systems are not generally provided with a mechanism to prevent a remote starting of the vehicle while it is in the in-gear configuration, most remote starter systems to date have not been suitable, nor safe, for use in association with vehicles having manual transmissions.

One attempt to overcome this shortcoming in the design of remote starter systems can be seen in U.S. Pat. No. 5,646,457 (Vakavtchiev) for a Neutral Safety Switch Control Device using a Rotatable Magnet for Controlling Remote Vehicle Starting of a Vehicle Equipped with a Manual Transmission. The Vakavtchiev patent discloses a device mounted in an interior seating compartment of a vehicle as a means for preventing a remote starting of the vehicle while its transmission is in gear. The Vakavtchiev device is connected to a remote starter system on a twelve volt positive battery powered circuit. The Vakavtchiev device is provided with a rotational component having a line or string coiled thereabout, with one end of the string being attached to a shifter handle portion of a user actuating means for shifting the transmission. One of the problems with the device disclosed in the Vakavtchiev patent is that it is clearly visible and accessible to drivers and passengers of the vehicle, such that the appearance of the device typically interferes with the natural aesthetics of the interior seating compartment of the vehicle, and further, such that the device may be subject to tampering and may be easily broken.

Accordingly, a primary object of the present invention is to provide a safety switch apparatus, for use in a remote starter system of a vehicle, that reduces the risk of the vehicle being started from a remote location while its transmission is in an in-gear configuration.

Another object of one aspect of the invention is to provide a safety switch apparatus, for use in a remote starter system of a vehicle, that reduces the risk of tampering therewith.

A further object of one aspect of the invention is to provide a safety switch apparatus, for use in a remote starter system of a vehicle, that may be safely used in a vehicle having a manual transmission.

An additional object of one aspect of the invention is to provide a safety switch apparatus, for use in a remote starter system of a vehicle, that is easily adjustable and is mountable on a user actuating means for shifting the transmission, whether or not said user actuating means has a shifter linkage rod.

A still further object of one aspect of the invention is to provide a safety switch apparatus, for use in a remote starter system of a vehicle, that is capable of detecting an intermediate configuration of the user actuating means of the vehicle.

A yet still further object of one aspect of the invention is to provide a safety switch apparatus, for use in a remote starter system of a vehicle, that is simple and easy to use.

Another object of one aspect of the invention is to provide a safety switch apparatus, for use in a remote starter system of a vehicle, that may be electrically connected to one or more operative wiring connections of the remote starter system.

Yet another object of one aspect of the invention is to provide a safety switch apparatus, for use in a remote starter system of a vehicle, that is substantially concealed and substantially exterior relative to the interior seating compartment of the vehicle.

Still yet another object of one aspect of the invention is to provide a safety switch apparatus, for use in a remote starter system of a vehicle, that is substantially weather resistant.

Another object of one aspect of the invention is to provide a safety switch apparatus, for use in a remote starter system of a vehicle, that is easy to install.

Yet another object of one aspect of the invention is to provide a safety switch apparatus, for use in a remote starter system of a vehicle, that is inexpensive and easy to manufacture.

SUMMARY OF THE INVENTION

In accordance with the present invention, there is disclosed a safety switch apparatus for use in a remote starter system of a vehicle having a transmission and a user actuating means for shifting the transmission. The user actuating means has a translatable portion that is moveable between a forward configuration, an intermediate configuration, and a rearward configuration. The forward and rearward configurations correspond to in-gear configurations of the transmission, and the intermediate configuration corresponds to a neutral configuration of the transmission. The starter system has a disabled starter configuration, and a default enabled starter configuration in which the vehicle is remotely startable.

According to the present invention, the safety switch apparatus has a magnetically actuated electrical switch means for switching the starter system from the default enabled starter configuration to the disabled starter configuration. The electrical switch means has an open switch configuration, and a closed switch configuration that is coincident with the disabled starter configuration of the starter system. A first configuration of the open and closed switch configurations is a default switch configuration. A respective other configuration of the open and closed switch configurations is a magnetically switched configuration. The safety switch apparatus also has a magnetic means for urging the electrical switch means from the default switch configuration into the magnetically switched configuration, when the magnetic means is in a substantially adjacent relation with the electrical switch means. A first one of the electrical switch means and the magnetic means is securely mountable at a fixed mounting position on the vehicle. A respective other one of the electrical switch means and the magnetic means is directly and securely mountable on the translatable portion of the user actuating means. As such, the respective other one is moveable relative to the first one. When the closed switch configuration is the default switch configuration, the magnetic means is in substantially adjacent relation with the electrical switch means when the translatable portion of the user actuating means is in the intermediate configuration. When the open switch configuration is the default switch configuration, the magnetic means comprises a forward magnetic means and a rearward magnetic means, and the forward magnetic means is in substantially adjacent relation with the electrical switch means when the translatable portion of the user actuating means is in the rearward configuration. By contrast, when the open switch configuration is the default switch configuration, the rearward magnetic means is in substantially adjacent relation with the electrical switch means when the translatable portion is in the forward configuration. The translatable portion of the user actuating means is operatively interposed between the transmission and a shifter handle portion of the user actuating means. Both the fixed mounting position and the translatable portion are substantially concealed and located substantially exterior relative to an interior seating compartment of the vehicle.

According to a further aspect of the invention, the closed switch configuration is the default switch configuration.

According to another aspect of the invention, the magnetic means includes a natural magnet.

According to a still further aspect of the invention, the first one is provided with a mounting plate, and the respective other one is provided with a mounting clamp.

According to an additional aspect of the invention, the electrical switch means is securely mountable at the fixed mounting position, and the magnetic means is directly and securely mountable on the translatable portion of the user actuating means.

According to a still yet further aspect of the invention, the mounting clamp has an adjustable magnet mounting portion.

According to a yet still further aspect of the invention, the electrical switch means further comprises an electrical circuit having a default closed circuit configuration and an open circuit configuration. When the electrical switch means is in the open switch configuration, the electrical circuit is in the open circuit configuration.

According to yet another aspect of the invention, the fixed mounting position is located on a frame of the vehicle. The translatable portion is located on a shifter linkage rod of the user actuating means.

BRIEF DESCRIPTION OF THE DRAWINGS

The novel features which are believed to be characteristic of the present invention, as to its structure, organization, use and method of operation, together with further objectives and advantages thereof, will be better understood from the following drawings, in which presently preferred and alternate embodiments of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
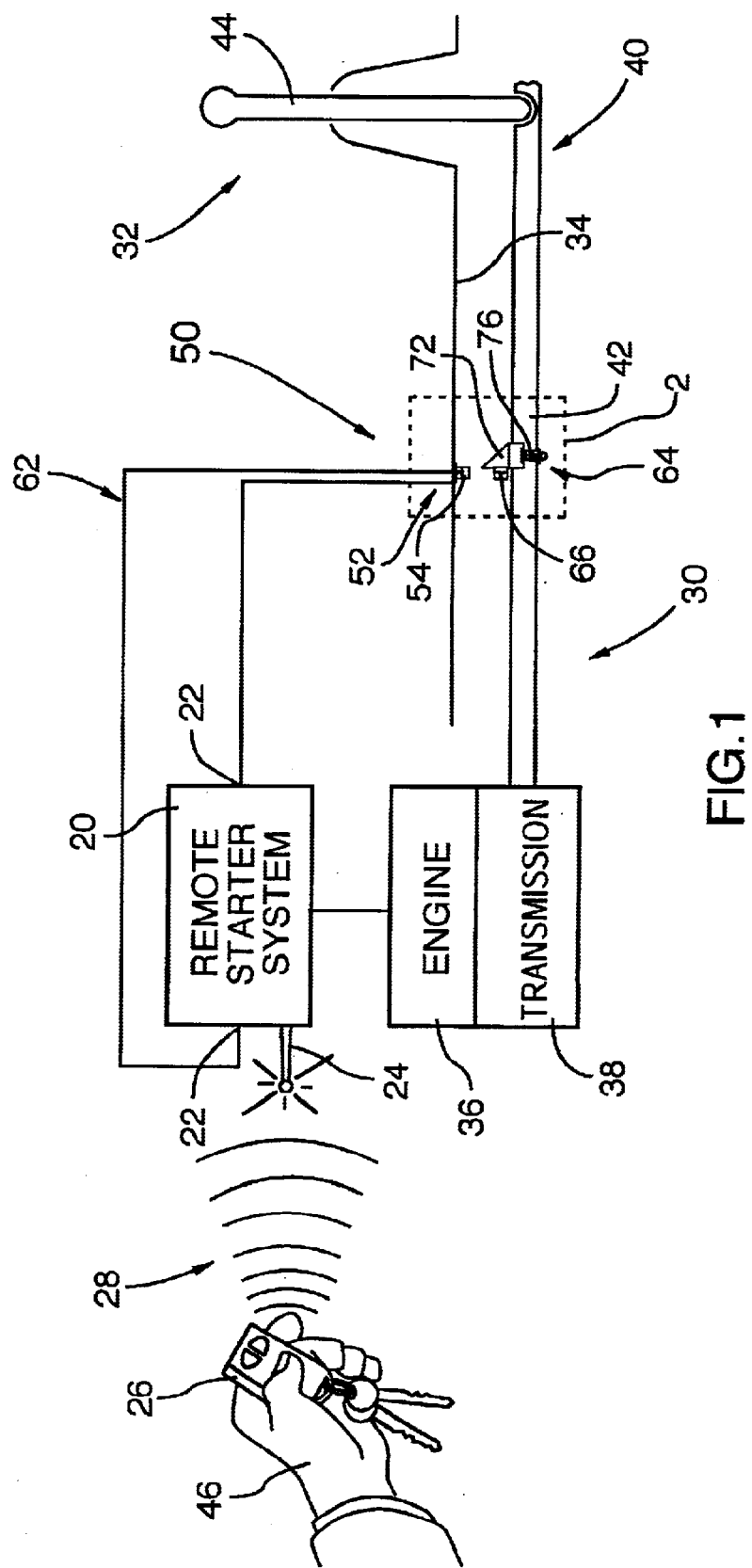
FIG. 1 is a left side schematic view of a preferred embodiment of a safety switch apparatus for use in a remote starter system of a vehicle, shown with an electrical switch means of the apparatus mounted on a frame of the vehicle, with a magnetic means of the apparatus mounted on a translatable shifter linkage rod of a user actuating means for shifting a transmission of the vehicle, and with the translatable shifter linkage rod shown in an intermediate configuration.
Figure 5:
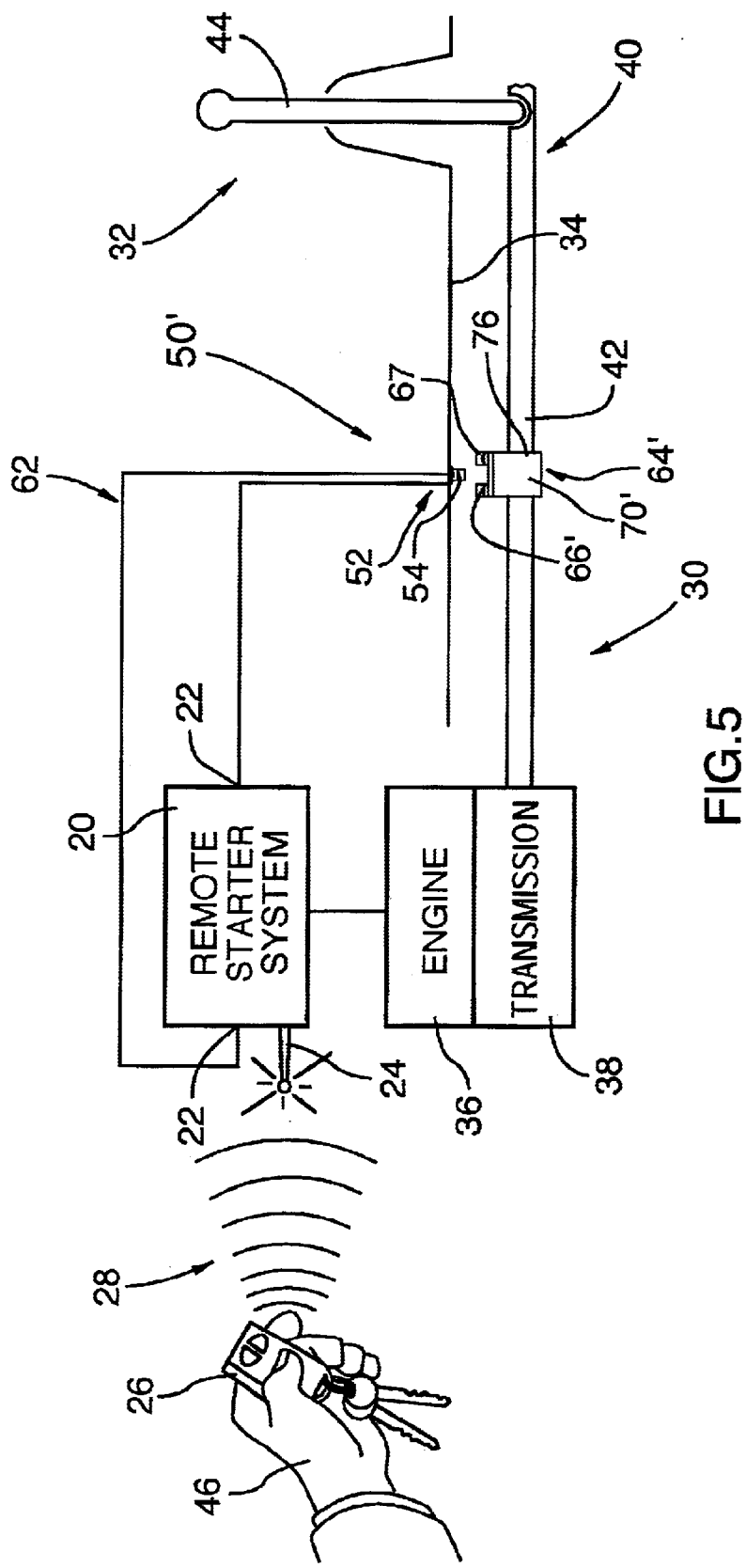
FIG. 5 is a left side schematic view of an alternate embodiment of the safety switch apparatus for use in the remote starter system of the vehicle, shown with an alternate electrical switch means of the apparatus mounted on the frame of the vehicle, with an alternate magnetic means of the apparatus mounted on the translatable shifter linkage rod of the user actuating means for shifting the transmission of the vehicle, and with the translatable shifter linkage rod shown in the intermediate configuration.

Referring now to FIGS. 1 and 5 of the drawings, there is respectively shown a preferred and an alternate embodiment of a safety switch apparatus, 50 and 50' respectively, according to the invention, for use in a remote starter system 20 of a vehicle 30 having a transmission 38 and a user actuating means 40 for shifting the transmission 38.

Figure 2:
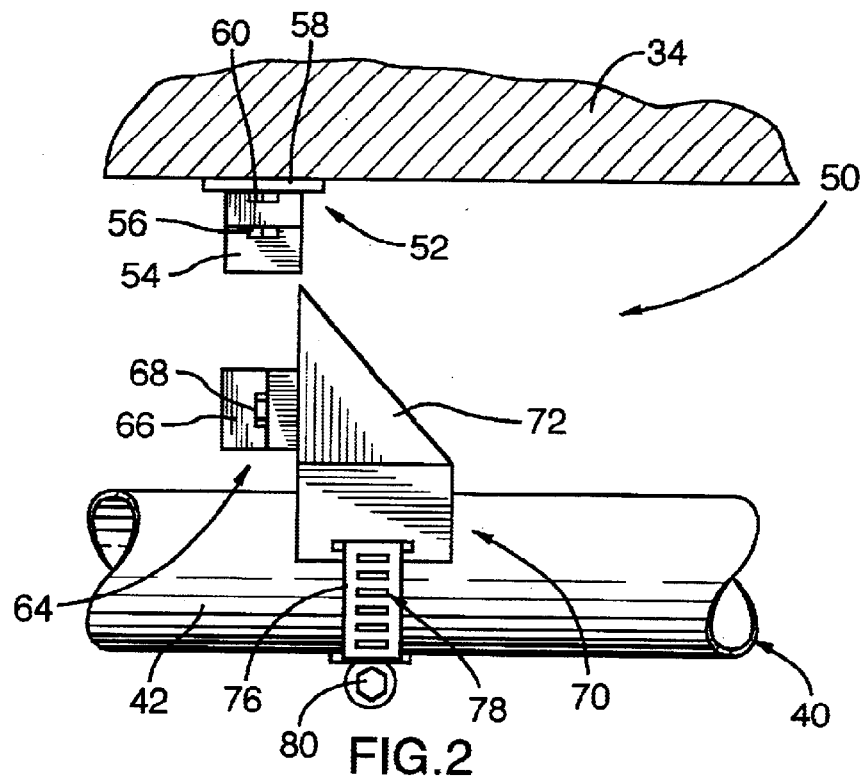
FIG. 2 is a left side elevational view, partly in section, of area 2 of FIG. 1, which area is enclosed by dotted lines.

As best illustrated in FIGS. 1 and 5, the user actuating means 40 shown in association with both the preferred and alternate embodiments of the invention, 50 and 50' respectively, is of a well-known type that has a translatable shifter linkage rod 42 that is moveable between a forward configuration (not shown), an intermediate configuration (as best illustrated in FIGS. 1, 2 and 5), and a rearward configuration (not shown). The use of the term "forward" in this specification indicates a direction that is generally oriented toward the left side of FIGS. 1 and 5. By contrast, the use of the term "rearward" indicates a direction that is generally oriented toward the right side of FIGS. 1 and 5. The forward and rearward configurations of the translatable shifter linkage rod 42 correspond to in-gear configurations of the transmission 38. The intermediate configuration of the translatable shifter linkage rod 42, shown in FIGS. 1, 2 and 5, corresponds to a neutral gear configuration of the transmission 38. In both the preferred and the alternate embodiments of the safety switch apparatus, 50 and 50' respectively, and as best illustrated in FIGS. 1 and 5, the translatable shifter linkage rod 42 is operatively interposed between the transmission 38 and a shifter handle portion 44 of the user actuating means 40.

The remote starter system 20, shown in FIGS. 1 and 5 in respective association with the preferred and alternate embodiments of the invention, 50 and 50' respectively, includes a remote vehicle starter (not shown) of the well-known type that is generally used in association with vehicles having automatic transmissions, such as, for example, the remote vehicle starter sold under the ATLASTART product name by G.I.T. Security Products, of Montreal, Québec, Canada, or that sold under the MODEL 800+ PLUS WITH ALARM product name by DSE Canada Inc., of Mont-Royal, Québec, Canada. When such a prior art remote starter system 20 is properly installed and wired in the vehicle 30, and provided that none of a number of predefined cutout conditions are then existing (as will be more fully described hereinbelow), the remote starter system 20 will remain in a default enabled starter configuration, such as to allow for the remote starting of the vehicle 30 when a start signal 28 is received from a removed location. Such a prior art remote starter system 20 also has a disabled starter configuration, corresponding to the existence of any one or more of said predefined cutout conditions (as more fully described below), in which the vehicle 30 will not be remotely startable, even if the start signal 28 is received by remote starter system 20.

The present invention, in effect, introduces a further cutout condition into the overall operation of the remote starter system 20, which further cutout condition is dependent upon the position of the translatable shifter linkage rod 42. That is, both the preferred and alternate embodiments of the safety switch apparatus, 50 and 50' respectively, operate to switch the remote starter system 20 from the default enabled starter configuration to the disabled starter configuration when the translatable shifter linkage rod 42 is moved from the intermediate configuration (corresponding to the neutral gear configuration of the transmission 38), illustrated in FIGS. 1, 2 and 5, to either of the forward or rearward configurations (both corresponding to in-gear configurations of the transmission 38), thereby significantly reducing the risk that the vehicle 30 might be remotely started when the transmission 38 is in an in-gear configuration. As such, when the safety switch apparatus 50 is properly installed in the remote starter system 20 of the vehicle 30, the forward and rearward configurations of the translatable shifter linkage rod 42, corresponding to in-gear configurations of the transmission 38, are included among the cutout conditions that are effective in switching the remote starter system 20, from the default enabled configuration, to the disabled starter configuration in which the vehicle 30 will not be remotely startable.

The preferred embodiment of the safety switch apparatus 50 of FIGS. 1 through 4 has a magnetically actuated electrical switch means 52 for switching the starter system 20 between the enabled starter configuration and the disabled starter configuration. The electrical switch means 52 has a default closed switch configuration, in which configuration a disable signal is electrically communicated through an electric circuit 62 to the remote starter system 20 to switch same to the disabled starter configuration. As such, the default closed switch configuration of the electrical switch means 52 is coincident with the disabled starter configuration of the remote starter system 20. As best illustrated in FIGS. 1 and 2, the safety switch apparatus 50 also has a magnetic means 64 for urging the electrical switch means 52 from its default closed switch configuration into an open switch configuration, when the magnetic means 64 is in a substantially adjacent relation with respect to the electrical switch means 52, which, as expanded upon below, is coincident with the translatable shifter rod 42 being in the intermediate configuration. In the open switch configuration, the continuity of the electrical circuit 62 is broken, such that the disable signal is not sent to the remote starter system 20, and such that the remote starter system 20 is in the default enabled configuration and the vehicle 30 may be remotely started.

Figure 3:
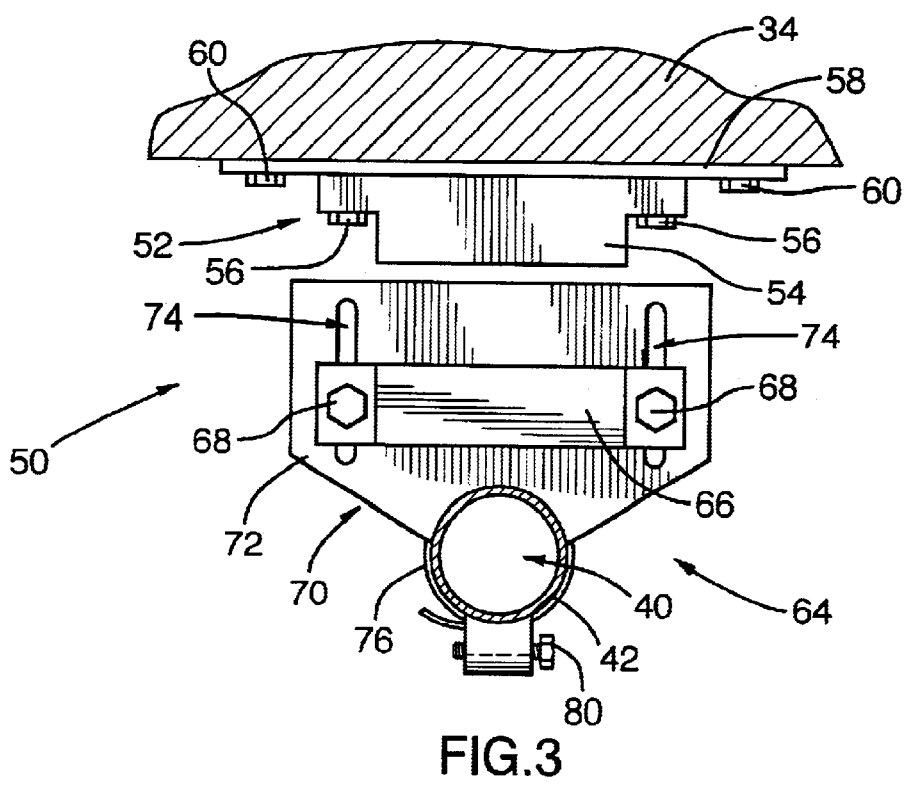
FIG. 3 is a front elevational view, partly in section, of the enclosed area 2 of FIG. 1.

In FIGS. 1 through 3, the electrical switch means 52 is shown securely mounted at a fixed mounting position on a vehicle frame 34 of the vehicle 30. In these figures, the magnetic means 64 is also shown directly and securely mounted on the translatable shifter linkage rod 42 of the user actuating means 40. As such, the magnetic means 64 is moveable relative to the electrical switch means 52. Both the fixed mounting position on the vehicle frame 34 and the translatable shifter linkage rod 42 are substantially concealed and substantially exterior relative to an interior seating compartment 32 of the vehicle 30. Therefore, the safety system apparatus 50 itself is substantially concealed and substantially exterior relative to the interior seating compartment 32 of the vehicle 30, such that there is a reduced risk of drivers and passengers of the vehicle 30 tampering with the safety system apparatus 50. As well, in part because both the fixed mounting position and the translatable shifter linkage rod 42 are typically substantially shielded from external environmental influences, the safety switch apparatus 50 is substantially weather resistant.

Figure 4:
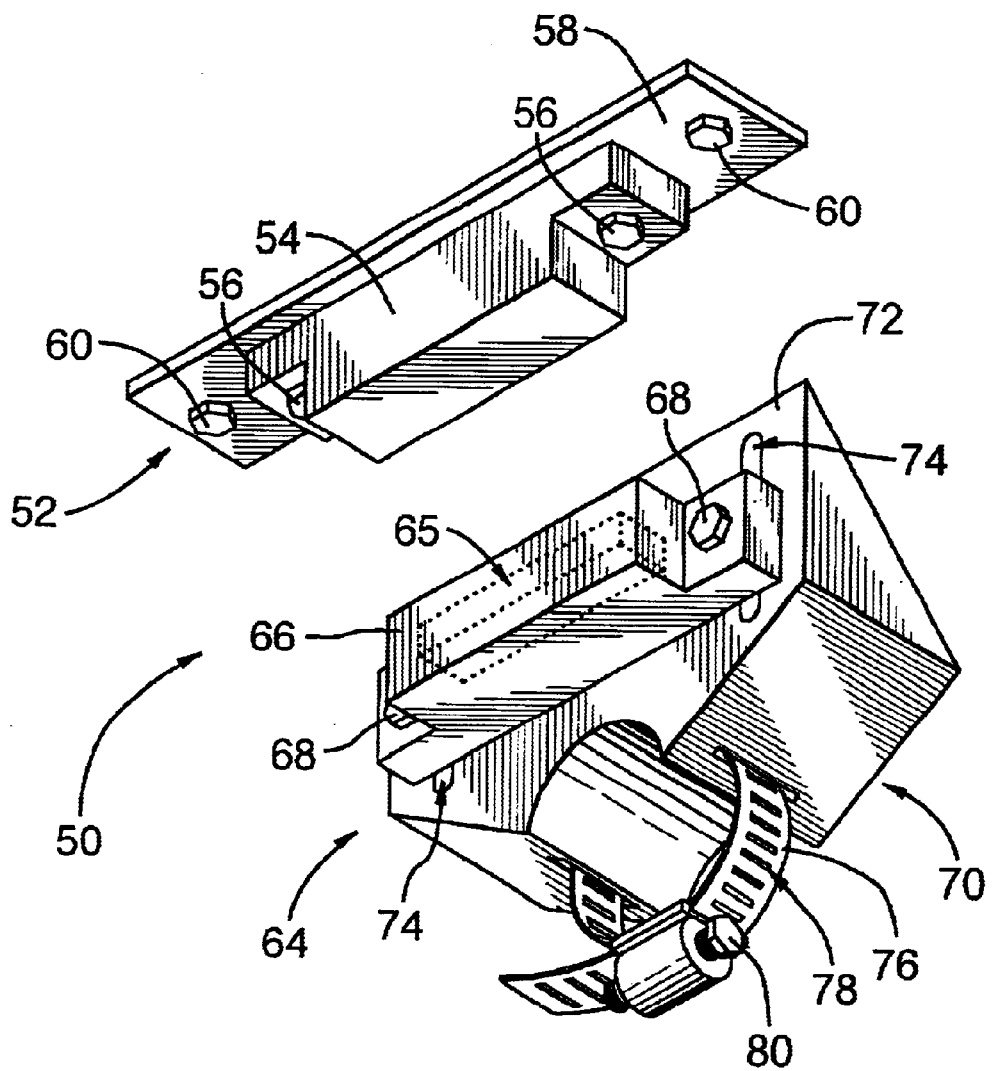
FIG. 4 is a bottom left perspective view of the preferred embodiment of the safety switch apparatus of FIG. 1, shown removed from the vehicle, and showing a natural magnet of the magnetic means in phantom outline.

The electrical switch means 52 and the magnetic means 64 may be of the general two part magnetic surface mount contact type that are used on doors in home and business alarm systems, such as, for example, those manufactured by the ADEMCO Group, of Syosset, N.Y., a division of the Pittway Corporation, of Chicago, Ill. As such, the electrical switch means 52 has a default closed magnetically actuated electrical switch (not shown) that is enclosed within a switch case member 54, as best seen in FIGS. 2 through 4. As illustrated in FIG. 4, the magnetic means 64 includes a natural magnet 65 that is enclosed within a magnet case member 66. When the magnetic means 64 is substantially adjacent to the electrical switch means 52, the natural magnet 65 exerts a magnetic force on the default closed magnetically actuated electrical switch that is sufficient to urge the electrical switch means 52 to the open switch configuration, which, as previously described, acts to open the electrical circuit 62, so as to prevent the disable signal from being communicated to the remote starter system 20, thereby allowing the vehicle 30 to be remotely started.

The switch case member 54 and a switch case mounting plate 58 are each shaped so as to define two switch case apertures therethrough (not shown). As best illustrated in FIG. 4, two switch case fasteners 56, securely fitting through respective ones of the switch case apertures, are used to securely mount the switch case member 54 to the switch case mounting plate 58. The switch case mounting plate 58 is shaped so as to define a further two vehicle frame apertures (not shown). As best illustrated in FIGS. 2 and 3, two plate fasteners 60, securely fitting through respective ones of the vehicle frame apertures and securely engaging the vehicle frame 34, are used to securely mount the switch case mounting plate 58 to the fixed mounting position on the vehicle frame 34. In this manner, the switch case member 54 is securely mounted at the fixed mounting position on the vehicle frame 34 of the vehicle 30. As such, the electrical switch means 52 of the safety switch apparatus 50 may be easily installed on the on the vehicle frame 34.

As best illustrated in FIGS. 2 through 4, the magnet case member 66 is attached to an adjustable magnet mounting portion 72 of a magnet case mounting clamp 70 by two magnet case fasteners 68, each of which respectively fits through a different magnet case aperture (not shown) that is defined by the shaping of the magnet case member 66. FIGS. 3 and 4 illustrate the shaping of the adjustable magnet mounting portion 72 so as to define two magnet adjusting slots 74, each of which respectively receives one of the two magnet case fasteners 68. The position of the magnet case member 66 may be adjusted relative to the adjustable mounting portion 72 of the magnet case mounting clamp 70, and relative to the electrical switch means 52, by slidably moving the magnet case fasteners 68, along with the magnet case member 66, in the respective magnet adjusting slots 74 before tightening same into secured relation, as is best shown in FIGS. 2 and 4. In the preferred embodiment 50 of the invention shown in FIGS. 1 through 4, and as best seen in FIGS. 1 and 2, the magnetic means 64 is in substantially adjacent relation with the electrical switch means 52 when the translatable shifter linkage rod 42 of the user actuating means 40 is in the intermediate configuration, and the transmission 38 is in the neutral gear configuration. The position of the magnet case member 66 may be adjusted relative to the electrical switch means 52, such that, in the neutral gear configuration of the transmission 38 and the intermediate configuration (shown in FIGS. 1 and 2) of the translatable shifter linkage rod 42, the magnetic means 64 and the electrical switch means 52 are in substantially adjacent relation, and such that the magnetic force exerted by the natural magnet 65 on the default closed magnetically actuated electrical switch of the electrical switch means 52 is sufficient to urge same from the default closed switch configuration (corresponding to the disabled starter configuration of the remote starter system 20) to the open switch configuration (corresponding to the default enabled starter configuration of the remote starter system 20), as aforesaid.

With specific reference to FIG. 2, it will be noted that the magnet case mounting clamp 70 is directly and securely mounted on the translatable shifter linkage rod 42 by an adjustable ring clamp portion 76 that is shaped so as to define a plurality of tightening slots 78, and includes a tightening screw 80. The adjustable ring clamp portion 76 may be of the general type that is typically used as a hose clamp, such as, for example, that sold by Hans Oetiker AG Maschinen, of Horgen, Switzerland, under the registered United States trademark OETIKER®. As such, the adjustable ring clamp portion 76 of the magnet case mounting clamp 70, together with the adjustable magnet mounting portion 72, enables the magnetic means 64 of the safety switch apparatus 50 to be easily installed and adjusted on the translatable shifter linkage rod 42 of the user actuating means 40 for shifting the transmission 38 of the vehicle 30. As well, because both the electrical switch means 52 and the magnetic means 64 are constructed from components that are readily available from a variety of sources, the safety switch apparatus 50 is inexpensive and easy to manufacture.

As is best shown in FIG. 1, in the preferred embodiment of the invention, the safety switch apparatus 50 and the electrical circuit 62 are in operative electrical communication with one or more pre-existing operative wiring connections 22 of the remote starter system 20. In a contemplated example, the safety switch apparatus 50 may be in operative electrical communication with a pre-existing hood open disable circuit of the remote starter system 20. As well, depending on the specific wiring of the remote starter system 20, and the presence or absence of any additional components in the electrical circuit 62, the safety switch apparatus 50 may be installed in operative electrical communication with either a twelve volt positive or a twelve volt negative input wiring connection on the remote starter system 20. In any case, the electrical circuit 62 will preferably be in the default closed circuit configuration when the electrical switch means 52 is in the default closed switch configuration, such that the remote starter system 20 is then in the disabled starter configuration, thus preventing the remote starting of the vehicle 30. By way of contrast, the electrical circuit 62 will preferably be in the open circuit configuration when the electrical switch means 52 is in the open switch configuration, such that the remote starter system 20 is then in the default enabled starter configuration, thus allowing remote starting of the vehicle 30.

In operation, and with specific reference to FIG. 1, when the transmission 38 of the vehicle 30 is in the neutral gear configuration, the translatable shifter linkage rod 42 is in the intermediate configuration, such that the magnetic means 64 is substantially adjacent to the electrical switch means 52. The electrical switch means 52 of the safety switch apparatus 50 is, thereby, urged into the open switch configuration, such that the remote starter system 20 is in the default enabled starter configuration, as aforesaid. At least insofar as the safety switch apparatus 50 is capable of detecting the intermediate configuration of the translatable shifter linkage rod 42 on its own and without the need for a user 46 to monitor same, it is simple and easy to use. Moreover, when the translatable shifter linkage rod 42 is in the intermediate configuration, as aforesaid, the user 46 may safely start an engine 36 of the vehicle 30 by simply using a conventional start signal transmitting unit 26 to send a start signal 28 to a start signal receiving portion 24 of the prior art remote starter system 20.

By way of contrast, if the transmission 38 of the vehicle 30 is in one of the in-gear configurations, the translatable shifter linkage rod 42 will be in either of the forward and the rearward configurations (not shown), such that the magnetic means 64 will not be substantially adjacent to the electrical switch means 52. As such, the electrical switch means 52 of the safety switch apparatus 50 will remain in its default closed switch configuration. In this configuration, sending the start signal 28 to the start signal receiving portion 24 will be ineffective in starting the engine 32 of the vehicle 30, since the remote starter system 20 will then be in the disabled starter configuration, as aforesaid. Once again, it will be noted that the safety switch apparatus 50 is simple and easy to use, substantially reducing the risk that the vehicle 30 might be started from a remote location while its transmission 38 is in the in-gear configuration. As such, the safety switch apparatus 50, and remote starter systems 20 equipped with same, may be safely used with manual transmission vehicles.

In the alternate embodiment of the safety switch apparatus 50' shown in FIG. 5, an alternate electrical switch means 52' has a default open switch configuration that is coincident with the default enabled starter configuration of the starter system 20. It is to be noted that, in FIG. 5, the same reference numerals have been used to indicate objects and components which are common to both the preferred embodiment 50 and the alternate embodiment 50'. In FIG. 5, an alternate magnetic means 64' is shown to have a forward magnetic means 66', and a rearward magnetic means 67, for urging the alternate electrical switch means 52' from the default open switch configuration into a closed switch configuration, when the alternate magnetic means 64' is in substantially adjacent relation (not shown) with the electrical switch means 52', thereby switching the remote starter system 20 into the disabled starter configuration. The alternate embodiment 50' is such that the forward magnetic means 66' is in substantially adjacent relation with the alternate electrical switch means 52' when the translatable shifter linkage rod 42 of the user actuating means 40 is in the rearward configuration (not shown), corresponding to one of the in-gear configurations of the transmission 38. By contrast, the rearward magnetic means 67 is in substantially adjacent relation with the alternate electrical switch means 52' when the translatable shifter linkage rod 42 is in the forward configuration (not shown), also corresponding to another one of the in-gear configurations of the transmission 38.

In operation of the alternate embodiment 50', and as shown in FIG. 5, when the translatable shifter linkage rod 42 is in the intermediate configuration, neither the forward nor the rearward magnetic means, 66' and 67 respectively, is substantially adjacent to the alternate electrical switch means 52'. As such, the alternate electrical switch means 52' of the safety switch apparatus 50' remains in its default open switch configuration, and the remote starter system 20 remains in its default enabled starter configuration. In this configuration, corresponding to the neutral gear configuration of the transmission 38, the user 46 may start the engine 32 of the vehicle 30 by simply using the start signal transmitting unit 26 to send the start signal 28 to the start signal receiving portion 24 of the remote starter system 20.

Other modifications and alterations may be used in the design and manufacture of the present invention without departing from its spirit and scope, which is limited only by the accompanying claims. For example, the magnetic means 64 might be provided with an electromagnet in place of, or in addition to, the natural magnet 65.

As well, in another example, mounting positions of the magnetic means 64 and of the electrical switch means 52 may be alternated with each other, such that the magnetic means 64 would then be mounted at the fixed position on the vehicle frame 34, and the electrical switch means 52 would then be mounted on the translatable shifter linkage rod 42.

As a further example of a modification that might be made to the invention, either or both of the magnetic means 64 and the electrical switch means 52 might be mounted by a mounting plate, a mounting clamp, and/or a different mounting means.

Modifications or alterations that may be used in the design of the switch case mounting plate 58 will include, for example, designs that are provided with vehicle frame adjusting slots in place of the vehicle frame apertures (not shown), so as to allow the position of the electrical switch means 52 to be more freely adjusted forward and rearward, and thus providing a further degree of freedom of motion in achieving the substantially adjacent relation of the electrical switch means 52 and the magnetic means 64 in the intermediate configuration of the user actuating means 40.

As a still further example of a modification that might be made to the invention, the magnetic means 64 might be mounted on a different translatable and substantially exterior portion of the user actuating means 40, other than the translatable shifter linkage rod 42, that is still operatively interposed between the transmission 38 and the shifter handle portion 44, such as, for example, on a portion of the user actuating means 40 below a shifter cover of the vehicle 30, such that both the magnetic means 64 and the electrical switch means 52 would still be substantially concealed and substantially exterior relative to the interior seating compartment 32 of the vehicle 30. This modification has particular application in vehicles that are not provided with a shifter linkage rod 42, but instead have a user actuating means that directly enters a housing of the transmission 38 to shift same (which arrangement is not shown in the figures) As such, it will be noted that the safety switch apparatus 50 may be mounted on the user actuating means 40 of the vehicle 30, whether or not same is provided with a shifter linkage rod 42.

Obviously, the present invention allows for a wide variety of different possible combinations of the various modifications and alterations specifically contemplated herein, and as such, it should perhaps be noted once again that the present invention is limited only by the accompanying claims.

I claim:

1. A safety switch apparatus for use in a remote starter system of a vehicle, said vehicle having a transmission and a user actuating means for shifting said transmission, said user actuating means having a translatable portion that is moveable between a forward configuration, an intermediate configuration and a rearward configuration, with said forward and rearward configurations corresponding to in-gear configurations of said transmission, and with said intermediate configuration corresponding to a neutral gear configuration of said transmission, said starter system having a disabled starter configuration and a default enabled starter configuration in which said vehicle is remotely startable, said safety switch apparatus comprising:

a) a magnetically actuated electrical switch means for switching said starter system from said default enabled starter configuration to said disabled starter configuration, said electrical switch means having an open switch configuration, and a closed switch configuration coincident with said disabled starter configuration of said starter system, with a first configuration of said open and closed switch configurations being a default switch configuration, and with a respective other configuration of said open and closed switch configurations being a magnetically switched configuration; and, b) magnetic means for urging said electrical switch means from said default switch configuration into said magnetically switched configuration when said magnetic means is in a substantially adjacent relation with said electrical switch means;

wherein a first one of said electrical switch means and said magnetic means is securely mountable at a fixed mounting position on said vehicle, and a respective other one of said electrical switch means and said magnetic means is directly and securely mountable on said translatable portion of said user actuating means, such that said respective other one is moveable relative to said first one; and such that, when said closed switch configuration is the default switch configuration, said magnetic means is in said substantially adjacent relation with said electrical switch means when said translatable portion is in said intermediate configuration; and when said open switch configuration is the default switch configuration, said magnetic means comprises a forward magnetic means and a rearward magnetic means, with said forward magnetic means being in said substantially adjacent relation with said electrical switch means when said translatable portion is in said rearward configuration, and with said rearward magnetic means being in said substantially adjacent relation with said electrical switch means when said translatable portion is in said forward configuration; and, wherein said translatable portion of said user actuating means is operatively interposed between said transmission and a shifter handle portion of said user actuating means, and said fixed mounting position and said translatable portion are substantially concealed and substantially exterior relative to an interior seating compartment of said vehicle.

2. A safety switch apparatus according to claim 1, wherein said closed switch configuration is the default switch configuration.

3. A safety switch apparatus according to claim 2, wherein said magnetic means comprises a natural magnet.

4. A safety switch apparatus according to claim 3, wherein said first one comprises a mounting plate, and said respective other one comprises a mounting clamp.

* * * * *